United States Patent
Lee et al.

(10) Patent No.: US 11,811,042 B2
(45) Date of Patent: Nov. 7, 2023

(54) ACTIVE MATERIAL COATING METHOD FOR SECONDARY BATTERY AND COATING APPARATUS

(71) Applicant: LG Chem, Ltd., Seoul (KR)

(72) Inventors: Sang Myeon Lee, Daejeon (KR); Hyung Seok Han, Daejeon (KR); Hyungkyun Yu, Daejeon (KR); Ki Hoon Paeng, Daejeon (KR); Jaewon Moon, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 17/263,660

(22) PCT Filed: Jan. 21, 2020

(86) PCT No.: PCT/KR2020/001011
§ 371 (c)(1),
(2) Date: Jan. 27, 2021

(87) PCT Pub. No.: WO2020/153711
PCT Pub. Date: Jul. 30, 2020

(65) Prior Publication Data
US 2021/0313553 A1    Oct. 7, 2021

(30) Foreign Application Priority Data

Jan. 22, 2019 (KR) .................. 10-2019-0008260

(51) Int. Cl.
*H01M 4/04* (2006.01)
*B05C 5/02* (2006.01)
(Continued)

(52) U.S. Cl.
CPC ......... *H01M 4/0404* (2013.01); *B05C 5/0254* (2013.01); *B05C 11/00* (2013.01); *B05C 21/005* (2013.01)

(58) Field of Classification Search
CPC ......... B05C 1/08; B05C 1/0804; B05C 11/00; H01M 4/0404; H01M 10/00; H01M 10/04; B05B 12/22
See application file for complete search history.

(56) References Cited

U.S. PATENT DOCUMENTS

| 10,680,232 B2 | 6/2020 | Kim et al. |
| 2009/0053399 A1 | 2/2009 | Imamura et al. |

(Continued)

FOREIGN PATENT DOCUMENTS

| EP | 1887641 A1 | 2/2008 |
| JP | 2008218079 A | 9/2008 |

(Continued)

OTHER PUBLICATIONS

International Search Report for Application No. PCT/KR2020/001011, dated May 8, 2020, pp. 1-2.

(Continued)

*Primary Examiner* — Tabassom Tadayyon Eslami
(74) *Attorney, Agent, or Firm* — Lerner David LLP

(57) ABSTRACT

A method of coating an active material for a secondary battery according to one embodiment of the present disclosure is a method of coating an active material on an electrode current collector of a secondary battery, the method comprising the steps of: disposing a guide member on each of the left and right sides based on a moving direction of the electrode current collector, and coating the active material onto the electrode current collector between the two guide members.

8 Claims, 5 Drawing Sheets

(51) Int. Cl.
   *B05C 11/00*      (2006.01)
   *B05C 21/00*      (2006.01)

(56)         References Cited

U.S. PATENT DOCUMENTS

2009/0068346 A1*  3/2009  Usui .................. H01M 4/0409
                                                          427/77
2012/0207914 A1    8/2012  Imamura et al.
2012/0288756 A1   11/2012  Kim
2018/0315991 A1   11/2018  Kim et al.

FOREIGN PATENT DOCUMENTS

JP            5008561 B2      8/2012
JP            5073924 B2     11/2012
JP           201362223 A      4/2013
KR          19990028142 A     4/1999
KR          20120126303 A    11/2012
KR          2015-0076426 A    7/2015
KR          20160087251 A     7/2016
KR          20160141448 A    12/2016
KR            101710169  *    2/2017
KR            101710169 B1    2/2017
KR            101797800  *   11/2017
KR            101797800 B1   11/2017
KR          20180008036 A     1/2018

OTHER PUBLICATIONS

Extended European Search Report including Written Opinion for
Application No. 20744650.1 dated Oct. 25, 2021, pp. 1-8.

* cited by examiner

[FIG. 1]
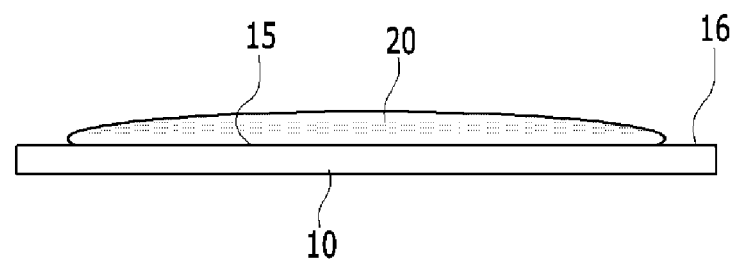
[FIG. 2]
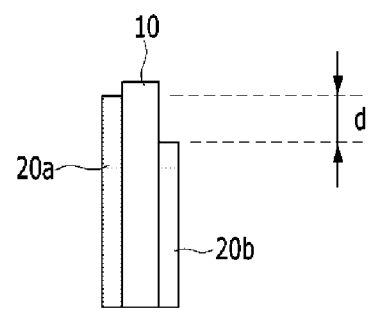
(a)
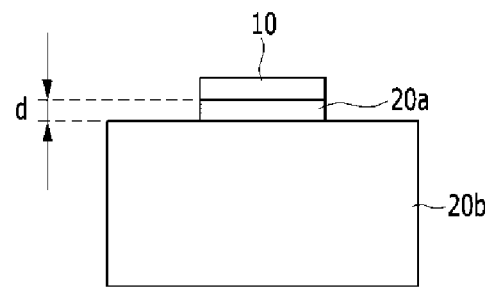
(b)

[FIG. 3]
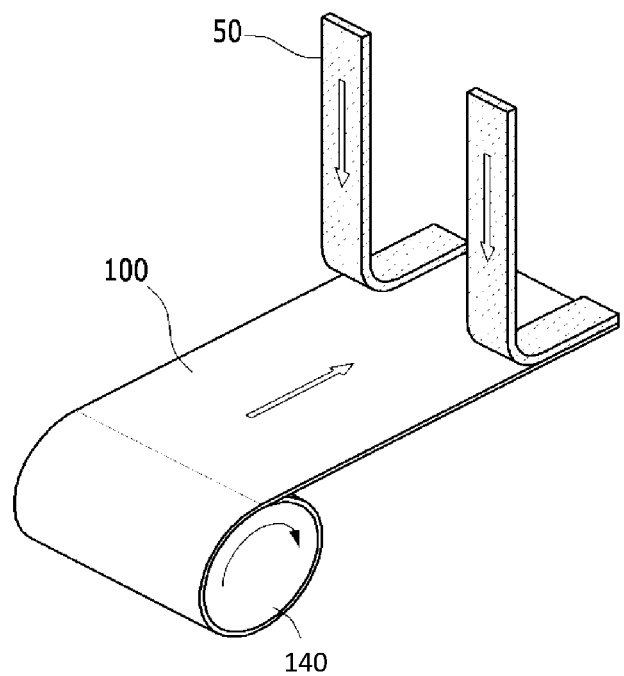
[FIG. 4]
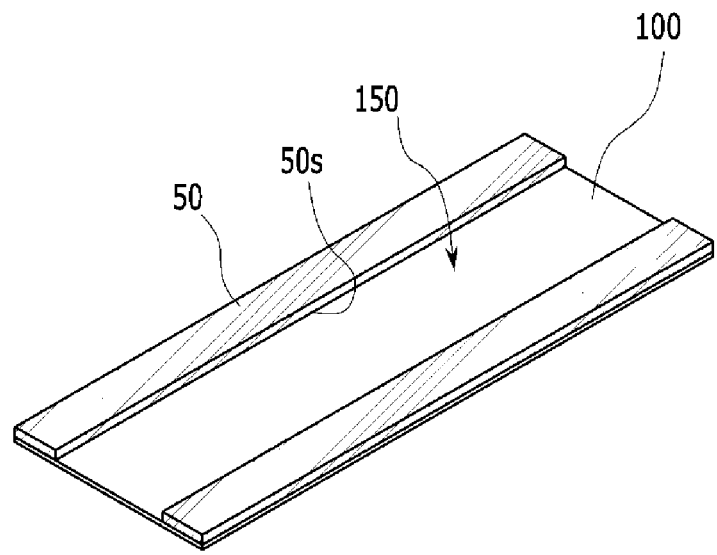

[FIG. 5]
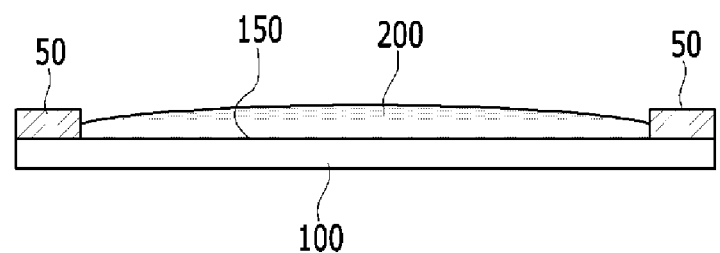
[FIG. 6]
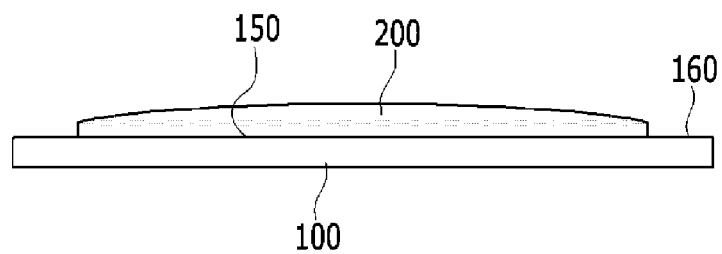

[FIG. 7]
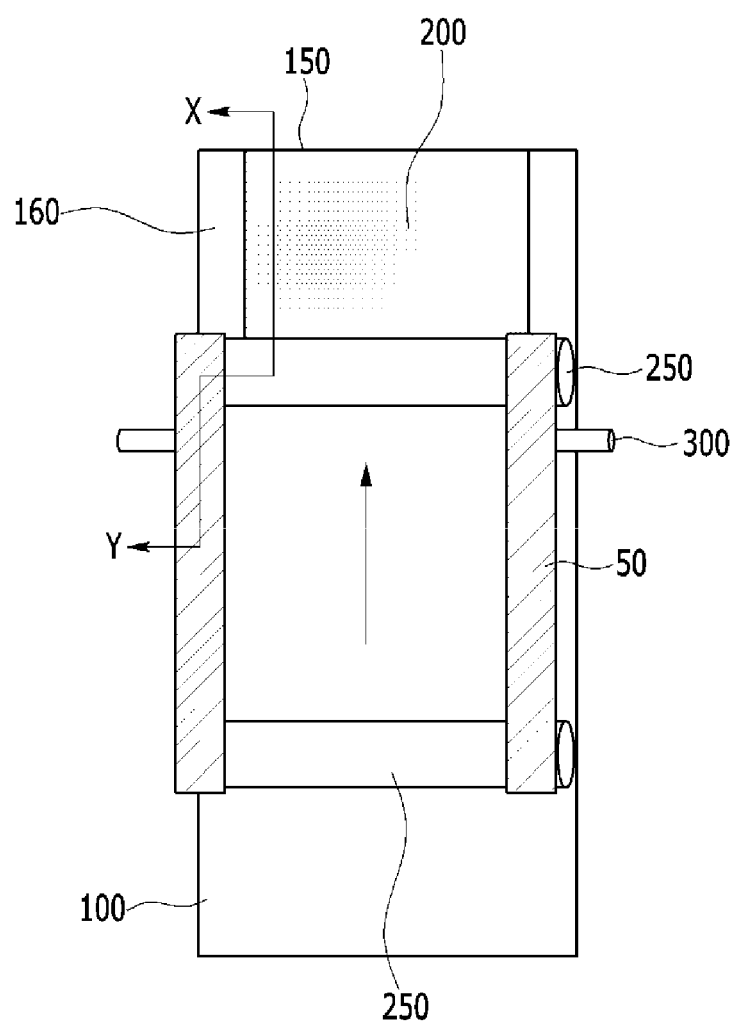

[FIG. 8]
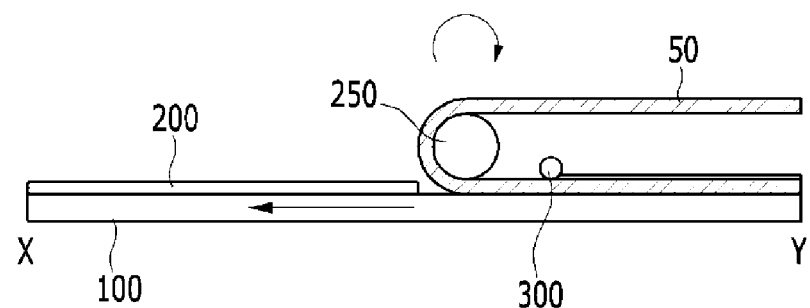
[FIG. 9]
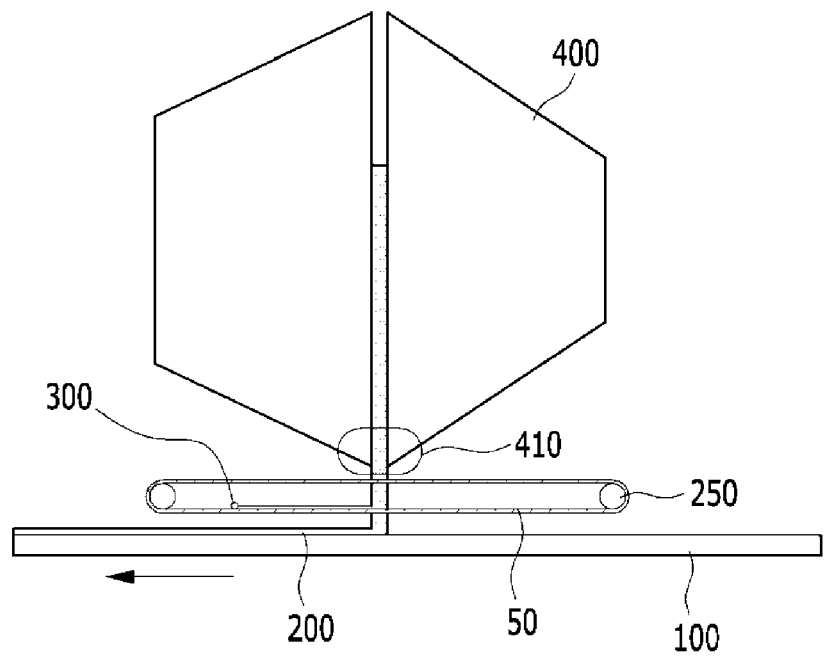

ACTIVE MATERIAL COATING METHOD FOR SECONDARY BATTERY AND COATING APPARATUS

CROSS-REFERENCE TO RELATED APPLICATIONS

The present application is a national phase entry under 35 U.S.C. § 371 of International Application No. PCT/KR2020/001011, filed on Jan. 21, 2020, which claims priority to Korean Patent Application No. 10-2019-0008260 filed on Jan. 22, 2019 with the Korean Intellectual Property Office, the disclosures of which are incorporated herein by reference in their entirety.

TECHNICAL FIELD

The present disclosure relates to a method and an apparatus for coating an active material for a secondary battery, and more particularly, to a method and an apparatus for coating an active material for a secondary battery which prevents distortions at coating boundaries during double-sided coating of an electrode current collector.

BACKGROUND ART

A secondary battery can be formed by inserting an electrode assembly composed of a positive electrode plate, a negative electrode plate and a separator into a case and then sealing the electrode assembly. Each of the positive electrode plate or the negative electrode plate (hereinafter referred to as "electrode plate") is produced by coating active material slurries onto a positive electrode conductive current collector or a negative electrode conductive current collector at a fixed thickness, and an electrode assembly can be formed by interposing a separator between the both conductive current collectors, followed by winding multiple times in a jelly-roll or cylindrical shape.

The electrode plate may be formed of an active material coated portion having the active material slurry coated thereon, and a non-coated portion not having the active material slurry coated thereon. The active material coated portion is subjected to rolling to have an increased adhesiveness with respect to an electrode current collector and to increase the capacity density of the active material. The rolled electrode plate may be dried and then cut into a predetermined size using a cutter of a predetermined width, to be then used.

FIG. 1 is a view showing a conventional electrode current collector. FIG. 2 is a view showing a coating imbalance occurring during double-sided coating of the electrode current collector.

Referring to FIG. 1, a coated portion 15 on which an active material layer 20 formed by coating an active material onto an electrode current collector 10 is located, and a non-coated portion 16 wherein the active material is not coated onto the electrode current collector 10, are formed. However, a difference in coating loading level is generated by surface tension in the process of coating the active material, which causes a problem that the thickness of the active material layer 20 is not uniform. In other words, the end portion of the active material layer 20 corresponding to a boundary between the non-coated portion 16 and the coated portion 15 is formed not vertically but is formed in a droplet shape, and thus, the active material layer 20 may have a difference in height as a whole. This difference in height can be alleviated in the rolling process, but it may be problematic during double-sided coating of the electrode current collector described hereinafter.

Referring to FIG. 2, a first active material layer 20a formed on one surface of the electrode current collector 10 and a second active material layer 20b formed on another surface are slightly changed in the coating width due to surface tension when rolling occurs. Therefore, a gap may be formed at a distance between the respective active material layers from one side end of the electrode current collector 10. This gap may increase the risk of ignition by contacting the active materials of different polarities with each other in the subsequent lamination process.

DETAILED DESCRIPTION OF THE INVENTION

Technical Problem

It is an object of the present disclosure to provide a method and an apparatus for coating an active material for a secondary battery, which prevents coating imbalance that may occur during double-sided coating of an electrode current collector.

However, the problem to be solved by the embodiments of the present disclosure is not limited to the above-described problems, and can be variously expanded within the scope of the technical idea included in the present disclosure.

Technical Solution

According to one embodiment of the present disclosure, there is provided a method of coating an active material for a secondary battery in which the active material is coated onto an electrode current collector of a secondary battery, the method comprising the steps of: disposing a guide member on each of the left and right sides based on a moving direction of the electrode current collector, and coating the active material onto the electrode current collector between the two guide members.

The moving direction of the electrode current collector may move in a linear direction by a first roller rotating in a first rotating direction.

The method of coating an active material for a secondary battery further includes a step in which the guide member is rotated and moved by a second roller that rotates along a second rotating direction that is the opposite direction to the first rotating direction, wherein the second roller may allow the guide member to rotate in place by a roller located at each of both ends of the guide member.

The method of coating an active material for a secondary battery may further include a step in which a cleaner disposed in the guide member sucks a remaining active material of the guide member while the guide member rotates.

Along with the movement of the electrode current collector and the guide member and the suction of the cleaner, the guide member from which the remaining active material is removed may be redisposed in an area where the active material is not coated.

One side surface forming a boundary with the coated portion among both side surfaces of the guide member may be perpendicular to an upper surface of the electrode current collector.

By using the coating method described above, one surface of the electrode current collector may be coated with the active material, and another surface of the electrode current collector may be coated in the same manner as in the method of coating one surface of the electrode current collector with the active material.

The method of coating an active material for a secondary battery may, after the step of coating the active material onto the electrode current collector, further comprise a step of removing the guide member from the electrode current collector, and a step of rolling the electrode current collector.

The guide member may be formed of one of a rubber belt and a cloth-based belt.

An area in which the guide member is disposed may correspond to a non-coated portion.

According to another embodiment of the present disclosure, there is provided an apparatus for coating an active material for a secondary battery, the apparatus comprising: a first roller for moving an electrode current collector, a guide member disposed to correspond to a non-coated portion of the electrode current collector, a second roller located respectively at both ends of the guide member to rotate the guide member in place, and a coating machine for coating the active material onto a coated portion of the electrode current collector, wherein the rotating direction of the first roller and the rotating direction of the second roller are opposite to each other.

The apparatus for coating an active material for a secondary battery further includes a cleaner disposed in the guide member, wherein the cleaner can suck a remaining active material of the guide member.

One side surface forming a boundary with the coated portion among both side surfaces of the guide member may be perpendicular to an upper surface of the electrode current collector.

The guide member may be formed of one of a rubber belt and a cloth-based belt.

Advantageous Effects

According to the embodiments, by disposing a guide member on an electrode current collector during the coating process, coating imbalance can be prevented during double-sided coating of the electrode current collector.

In addition, since cleaning is performed while the guide member rotates, coating can be continuously performed without replacing the guide member.

BRIEF DESCRIPTION OF THE DRAWINGS

FIG. 1 is a view showing a conventional electrode current collector.

FIG. 2 is a view showing a coating imbalance occurring during double-sided coating of an electrode current collector.

FIGS. 3 to 8 are views showing a method of coating an active material for a secondary battery according to one embodiment of the present disclosure.

FIG. 9 is a view showing an apparatus for coating an active material for a secondary battery according to another embodiment of the present disclosure.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

Further, throughout the specification, when a part is referred to as "including" a certain component, it means that it can further include other components, without excluding the other components, unless otherwise stated.

FIGS. 3 to 8 are views showing a method of coating an active material for a secondary battery according to one embodiment of the present disclosure.

Referring to FIG. 3, a method of coating an active material for a secondary battery according to one embodiment of the present disclosure is a method of coating an active material on an electrode current collector of a secondary battery, the method comprising the step of disposing a guide member 50 on each of the left and right sides based on a moving direction of the electrode current collector 100. The electrode current collector 100 may move in a linear direction by rotation of a first roller 140. The electrode current collector 100 is not particularly limited as long as it has high conductivity without causing a chemical change in an electrode for a secondary battery according to the present embodiment. A fine unevenness may be formed on a surface of the electrode current collector 100 to increase the binding force of the active material, and the electrode current collector 100 may have various shapes such as a film, a sheet, a foil, a net, a porous body, a foam body and a non-woven fabric.

The guide member 50 may be formed of one of a rubber belt and a cloth-based belt. The guide member 50 allows the coated portion of the electrode current collector 100 to be uniformly coated in the process of coating the active material in a subsequent process.

FIG. 4 shows a state in which the guide member 50 is disposed on both side surfaces of the electrode current collector 100 before coating the active material. Referring to FIG. 4, one side surface 50s forming a boundary with the coated portion among both side surfaces of the guide member 50 may be perpendicular to an upper surface of the electrode current collector 100. In other words, the two guide members 50 are positioned to be spaced apart from each other, and the active material may be coated between the two guide members 50 in a process described hereinafter. At this time, the side surface of the guide member 50 forming a boundary with the coated portion 150 in which the active material is coated refers to a side surface of the guide member 50 which is exposed to the side of the coated portion 150.

Referring to FIG. 5, an electrode slurry is coated between two guide members 50 spaced apart from each other to form an active material layer 200. The electrode slurry may include a mixture of an active material, a conductive material and a binder. In this case, referring to FIGS. 1 and 5, as a first roller 150 rotates in a first rotating direction, the electrode slurry can be coated onto the coated portion 150, while the electrode current collector 100 moves linearly in the direction of the arrow in FIG. 1. In other words, the electrode slurry can be continuously coated onto the electrode current collector 100 in a direction opposite to the arrow in FIG. 1.

Referring to FIG. 6, when the active material layer 200 is formed and then dried, the guide member 50 may be removed. After removing the guide member 50, an electrode for a secondary battery can be formed by passing through a rolling process.

FIG. 7 is a view showing an apparatus for coating an active material for a secondary battery including a cleaner. FIG. 8 is a cross-sectional view taken along the cutting line X-Y of FIG. 7.

Referring to FIGS. 7 and 8, while including most of the embodiments illustrated in FIGS. 3 to 6, the following contents may be further included.

The method of coating an active material for a secondary battery according to the present embodiment may further include a step in which the guide member 50 is rotated and moved by a second roller 250 that rotates along a second rotating direction that is the opposite direction to the first rotating direction of the first roller 140 shown in FIG. 3. In this case, the second roller 250 may allow the guide member 50 to rotate in place by a roller located respectively at both ends of the guide member 50. Here, the both ends of the guide member 50 indicate both ends of the guide member 50 spaced apart from each other along the moving direction of the electrode current collector 100.

Further, according to the present embodiment, the method may further include a step in which a cleaner 300 disposed in the guide member 50 sucks a remaining active material of the guide member 50 while the guide member 50 rotates. Along with the movement of the electrode current collector 100 and the guide member 50 and the suction of the cleaner 300, the guide member 50 from which remaining active materials are removed may be redisposed in an area of a non-coated portion where the active material is not coated. In other words, when the active material is coated between two guide members 50 by using an active material coating machine 400 shown in FIG. 9 to be described later in a state where the guide member 50 is disposed, a portion of the active materials remains on the guide member 50 as well. When such remaining active materials are sucked through the cleaner 300 and the guide member 50 is redisposed on the electrode current collector 100 through the rotational movement, the guide member 50 can be continuously used without replacement, and therefore, the process efficiency can be improved.

Referring to FIG. 8, if a rotation speed along the second rotating direction of the second roller 250 conforms to a rotation speed along the first rotating direction of the first roller 150 in FIG. 3, the guide member 50 can rotate in place even though the electrode current collector 100 moves linearly along the direction of the arrow in FIG. 8.

One surface of the electrode current collector 100 can be coated with an active material by using the coating method described above, and then the other surface of the electrode current collector 100 can also be coated in the same manner as in the coating method described above. In this case, the guide member 50 is used to clarify a coating area and to reduce a difference in distortion occurring on both side surfaces of the electrode current collector 100 according to an end shape generated by a surface tension, whereby the risk of ignition can be reduced. In particular, if there is no guide member as in the present embodiment, the coated end portion may be distorted for various reasons. According to the present embodiment, the guide member 50 can reduce an error due to surface tension and minimize a difference in two-stage coating of the upper and lower surfaces of the electrode current collector 100.

FIG. 9 is a view showing an apparatus for coating an active material for a secondary battery according to another embodiment of the present disclosure.

The apparatus for coating an active material for a secondary battery according to the present embodiment may be an exemplary means for performing the method of coating an active material for a secondary battery as described above. Referring to FIGS. 3 to 8 described above and FIG. 9, the apparatus for coating an active material for a secondary battery according to the present embodiment comprises: a first roller 140 for moving an electrode current collector 100, a guide member 50 disposed to correspond to a non-coated portion 160 of the electrode current collector 100, a second roller 250 located respectively at both ends of the guide member 50 to rotate the guide member 50 in place, and a coating machine 400 for coating the active material onto the coated portion 150 of the electrode current collector 100. In this case, the rotating direction of the first roller 140 and the rotating direction of the second roller 250 are opposite to each other. The coating machine 400 may be provided with a coating injection port 410 for injecting an active material onto the electrode current collector 100.

The coating apparatus according to the present embodiment further includes a cleaner 300 disposed in the guide member 50, wherein the cleaner 300 can suck the remaining active material of the guide member 50. One side surface forming a boundary with the coated portion 150 among both side surfaces of the guide member 50 may be perpendicular to an upper surface of the electrode current collector 100.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

The invention claimed is:

1. A method of coating an active material for a secondary battery in which the active material is coated onto an electrode current collector of the secondary battery, the method comprising:
   disposing a guide member on each of a left and right side based on a moving direction of the electrode current collector, and
   coating the active material onto the electrode current collector between the two guide members,
   wherein the moving direction of the electrode current collector is in a linear direction by a first roller rotating in a first rotating direction, and
   wherein the method further comprises a process in which the guide member is moved by a second roller at both ends of the guide member that rotates along a second rotating direction that is an opposite direction to the first rotating direction;
   wherein the second roller allows the guide member to travel in place, and
   wherein the guide member is disposed on each of a left and right side based on a moving direction of the electrode current collector upstream of coating the active material.

2. The method of coating an active material for a secondary battery according to claim 1, wherein one side surface forming a boundary with a coated portion among both side surfaces of the guide member is perpendicular to an upper surface of the electrode current collector.

3. The method of coating an active material for a secondary battery according to claim 1, wherein a first surface of the electrode current collector is coated with the active material by using the coating method of claim 1, and a second surface of the electrode current collector is coated in the same manner as in the method of coating the first surface of the electrode current collector with the active material.

4. The method of coating an active material for a secondary battery according to claim 1, wherein after the coating the active material onto the electrode current collector, the method further comprises:
   removing the guide member from the electrode current collector, and
   rolling the electrode current collector.

5. The method of coating an active material for a secondary battery according to claim 1, wherein the guide member is formed of one of a rubber belt and a cloth-based belt.

6. The method of coating an active material for a secondary battery according to claim 1, wherein an area in which the guide member is disposed corresponds to a non-coated portion.

7. The method of coating an active material for a secondary battery according to claim 1, wherein the method further comprises suctioning remaining active materials of the guide member using a cleaner disposed in the guide member while the guide member travels.

8. The method of coating an active material for a secondary battery according to claim 7, wherein along with the movement of the electrode current collector and the guide member and the suction of the cleaner, the guide member from which the remaining active material is removed is redisposed in an area where the active material is not coated.

\* \* \* \* \*